US011182889B2

(12) United States Patent
Wang et al.

(10) Patent No.: US 11,182,889 B2
(45) Date of Patent: Nov. 23, 2021

(54) SYSTEM AND METHOD FOR AUTHENTICATING PHYSICAL OBJECTS BASED ON CAPTURED IMAGES

(71) Applicant: Alibaba Group Holding Limited, Grand Cayman (KY)

(72) Inventors: Yan Wang, Beijing (CN); Xuetao Feng, Beijing (CN)

(73) Assignee: Alibaba Group Holding Limited, George Town (KY)

( * ) Notice: Subject to any disclaimer, the term of this patent is extended or adjusted under 35 U.S.C. 154(b) by 143 days.

(21) Appl. No.: 16/126,597

(22) Filed: Sep. 10, 2018

(65) Prior Publication Data
US 2019/0102873 A1 Apr. 4, 2019

(30) Foreign Application Priority Data
Sep. 29, 2017 (CN) .......................... 201710911613.4

(51) Int. Cl.
*G06T 7/00* (2017.01)
*G06K 9/46* (2006.01)
(Continued)

(52) U.S. Cl.
CPC .......... *G06T 7/0002* (2013.01); *G06K 9/2027* (2013.01); *G06K 9/46* (2013.01); *G06K 9/4661* (2013.01); *G06K 9/54* (2013.01); *G06K 9/6268* (2013.01); *H04L 63/08* (2013.01); *H04L 63/0853* (2013.01); *H04N 5/2256* (2013.01); *G06T 3/40* (2013.01); *G06T 3/60* (2013.01); *G06T 5/003* (2013.01);
(Continued)

(58) Field of Classification Search
CPC .... G06K 7/10732; G06K 9/4661; G06K 9/54; H04N 1/00047; H04N 5/2256; G06T 7/0002; G06T 2207/20081; G06T 3/40; H04L 63/0853
USPC .......................................................... 726/6
See application file for complete search history.

(56) References Cited

U.S. PATENT DOCUMENTS 6,397,334 B1 * 5/2002 Chainer ................. G01S 17/88
380/200
7,401,012 B1 7/2008 Bonebakker
(Continued)

FOREIGN PATENT DOCUMENTS

WO 2017059576 4/2017
WO 2018055340 3/2018

OTHER PUBLICATIONS

Hyungtae Lee et al.: "Fast Object Localization Using a CNN Feature Map Based Multi-Scale Search", arxiv.org, Cornell University Library, 201 Olin Library Cornell University Ithaca, NY 14853, Apr. 12, 2016, XP080695042, Section 3.2, Figure 3.
(Continued)

*Primary Examiner* — Bryan F Wright
(74) *Attorney, Agent, or Firm* — Shun Yao; Park, Vaughan, Fleming & Dowler LLP

(57) ABSTRACT

One embodiment can provide a system for authenticating an object. During operation, the system configures an environment surrounding the object according to one or more target environmental factors, captures at least a first image of the object while the object is exposed to the target environmental factors, and determines Fan authenticity of the object based on the captured first image and the target environmental factors.

15 Claims, 9 Drawing Sheets

(51) Int. Cl.

| | | |
|---|---|---|
| *G06K 9/54* | (2006.01) | |
| *H04N 5/225* | (2006.01) | |
| *H04L 29/06* | (2006.01) | |
| *G06K 9/62* | (2006.01) | |
| *G06K 9/20* | (2006.01) | |
| *G06T 3/40* | (2006.01) | |
| *G06T 3/60* | (2006.01) | |
| *G06T 5/00* | (2006.01) | |

(52) U.S. Cl.
CPC ............. *G06T 2207/10152* (2013.01); *G06T 2207/20081* (2013.01); *G06T 2207/20224* (2013.01); *G06T 2207/30176* (2013.01)

(56) References Cited

U.S. PATENT DOCUMENTS

| | | | |
|---|---|---|---|
| 7,872,584 B2* | 1/2011 | Chen | G08B 17/12 340/628 |
| 8,180,629 B2 | 5/2012 | Rehberg | |
| 8,448,226 B2* | 5/2013 | Narasimhan | G06F 21/36 726/5 |
| 8,966,613 B2* | 2/2015 | Horvitz | H04L 9/3231 726/17 |
| 9,582,843 B2* | 2/2017 | Leonard | H04N 5/44 |
| 9,607,138 B1 | 3/2017 | Baldwin | |
| 10,475,014 B1* | 11/2019 | Ramalingam | G06Q 20/206 |
| 10,554,738 B1 | 2/2020 | Ren | |
| 2001/0046659 A1 | 11/2001 | Oster | |
| 2002/0136459 A1* | 9/2002 | Imagawa | G06K 9/522 382/218 |
| 2004/0167765 A1 | 8/2004 | Abu El Ata | |
| 2004/0196363 A1* | 10/2004 | Diamond | G06K 7/10732 348/64 |
| 2009/0087025 A1* | 4/2009 | Ma | G06K 9/00771 382/103 |
| 2009/0206993 A1 | 8/2009 | Di Mambro | |
| 2010/0128923 A1* | 5/2010 | Kiya | H04N 1/00047 382/100 |
| 2011/0069892 A1* | 3/2011 | Tsai | G06K 9/3241 382/218 |
| 2011/0162679 A1* | 7/2011 | Demmeler | G07D 11/26 134/21 |
| 2013/0015946 A1 | 1/2013 | Lau | |
| 2013/0182002 A1* | 7/2013 | Macciola | G06T 5/003 345/589 |
| 2013/0208103 A1 | 8/2013 | Sands | |
| 2014/0037184 A1 | 2/2014 | Gorski | |
| 2014/0270411 A1 | 9/2014 | Shu | |
| 2014/0313334 A1* | 10/2014 | Slotky | G01N 21/9515 348/148 |
| 2015/0036891 A1* | 2/2015 | Takenouchi | G06K 9/2018 382/112 |
| 2015/0110364 A1 | 4/2015 | Niinuma | |
| 2015/0110366 A1 | 4/2015 | Sezille | |
| 2015/0341370 A1 | 11/2015 | Khan | |
| 2016/0034786 A1 | 2/2016 | Suri | |
| 2016/0063235 A1 | 3/2016 | Tussy | |
| 2016/0283787 A1 | 9/2016 | Nepomniachtchi | |
| 2016/0307029 A1 | 10/2016 | Vaknin | |
| 2017/0048244 A1 | 2/2017 | Loughlin-Mchugh | |
| 2017/0060867 A1 | 3/2017 | Moutinho | |
| 2017/0061563 A1 | 3/2017 | Falkenstern | |
| 2018/0083973 A1 | 3/2018 | Paraskevas | |
| 2018/0247112 A1* | 8/2018 | Norimatsu | G06K 9/00671 |
| 2019/0035112 A1* | 1/2019 | Lee | G06T 7/90 |
| 2019/0156178 A1 | 5/2019 | Thornton | |
| 2019/0266015 A1 | 8/2019 | Chandra | |
| 2019/0355366 A1 | 11/2019 | Ng | |
| 2020/0005151 A1 | 1/2020 | Jiang | |
| 2020/0050939 A1 | 2/2020 | Zhu | |

OTHER PUBLICATIONS

Zhou Huabing et al.: "Image Classification Based on Region of Interest Detection", Visual Communications and Image Processing; Jan. 20, 2004; San Jose; vol. 9813, Dec. 14, 2015, p. 98130U-98130U, XP060063208, paragraph [0001]; figure 1.

W. Samek, T. Wiegand, and K.-R. Muller. (2017). Explainable artificial Intelligence: understanding, visualizing and interpreting deep learning models.: [Online], Available: https://arxiv.org/abs/1708.08296 (Year: 2017).

* cited by examiner

SYSTEM AND METHOD FOR AUTHENTICATING PHYSICAL OBJECTS BASED ON CAPTURED IMAGES

RELATED APPLICATION

Under 35 U.S.C. § 119, this application claims the benefit and right of priority of Chinese Patent Application No. 201710911613.4, filed 29 Sep. 2017.

BACKGROUND

Field

This disclosure is generally related to the field of image recognition. More specifically, this disclosure is related to a system and method for determining, based on captured images of an object, whether the object is a physical object.

Related Art

The proliferation of e-commerce and smartphones can allow users to conduct various types of business over their smartphones, such as opening a financial account or a mobile phone account. Moreover, many financial institutions (e.g., banks) also allow their customers to conduct banking business, such as depositing checks, over their smartphones. Many of these business activities require a user to capture, using a camera installed on the smartphone, images of an original document, such as a government-issued identification (ID) card, a passport, or a check.

However, there remains the concern of fraud. For example, when required to prove his identity, instead of the real government-issued ID, a user may use the smartphone to capture the image of an electronic or paper copy of the government-issued ID. Such an electronic or paper copy can be illegally obtained (i.e., the user does not own the original ID) or have been edited (e.g., using photo-editing software). Similarly, when depositing a check, a fraudulent user may capture the image of an electronic or paper copy of the check, because he is not the real owner of the check.

To prevent fraud, many service providers (e.g., financial service providers) have to rely on manual processes to verify the authenticity of objects within the captured images (i.e., whether they are images of the real physical object). Such manual processes can be costly and inefficient, often resulting in long waiting times for users using the services.

SUMMARY

One embodiment can provide a system for authenticating an object. During operation, the system configures an environment surrounding the object according to one or more target environmental factors, captures at least a first image of the object while the object is exposed to the target environmental factors, and determines an authenticity of the object based on the captured first image and the target environmental factors.

In a variation on this embodiment, determining the authenticity of the object can include applying a machine-learning technique.

In a further variation, applying the machine-learning technique can further include extracting pre-determined features from the captured first image and applying the extracted features as input to a previously trained machine-learning module.

In a further variation, applying the machine-learning technique can further include applying at least a portion of the captured first image as input to a previously trained machine-learning module.

In a variation on this embodiment, the system can further perform one or more of: rotating the captured first image, cropping the captured first image, and pre-processing the captured image to reduce blurriness.

In a variation on this embodiment, the system can capture a second image of the object while the object is exposed to one or more environmental factors that are different from the one or more target environmental factors and determine the authenticity of the object based on a difference between the captured first and second images.

In a further variation, determining the authenticity of the object can include generating a differential image based on the captured first and second images and applying the differential image or features extracted from the differential image as input to a previously trained machine-learning module.

In a variation on this embodiment, the target environmental factors can include one or more of: a target illumination condition, a target temperature, a target humidity level, a target air pressure level, a target electrical field condition, and a target magnetic field condition.

One embodiment can provide a system for authenticating a user. During operation, the system can receive a service request from the user, prompt the user to display an identification card to a camera, configure an environment surrounding the identification card according to one or more target environmental factors, and configure the camera to capture at least a first image of the identification card while the identification card is exposed to the target environmental factors. The system can then determine an authenticity of the identification card based on the captured first image and the target environmental factors, and authenticate the user based on the determined authenticity of the identification card.

BRIEF DESCRIPTION OF THE FIGURES

In the figures, like reference numerals refer to the same figure elements.

DETAILED DESCRIPTION

Figure 1:
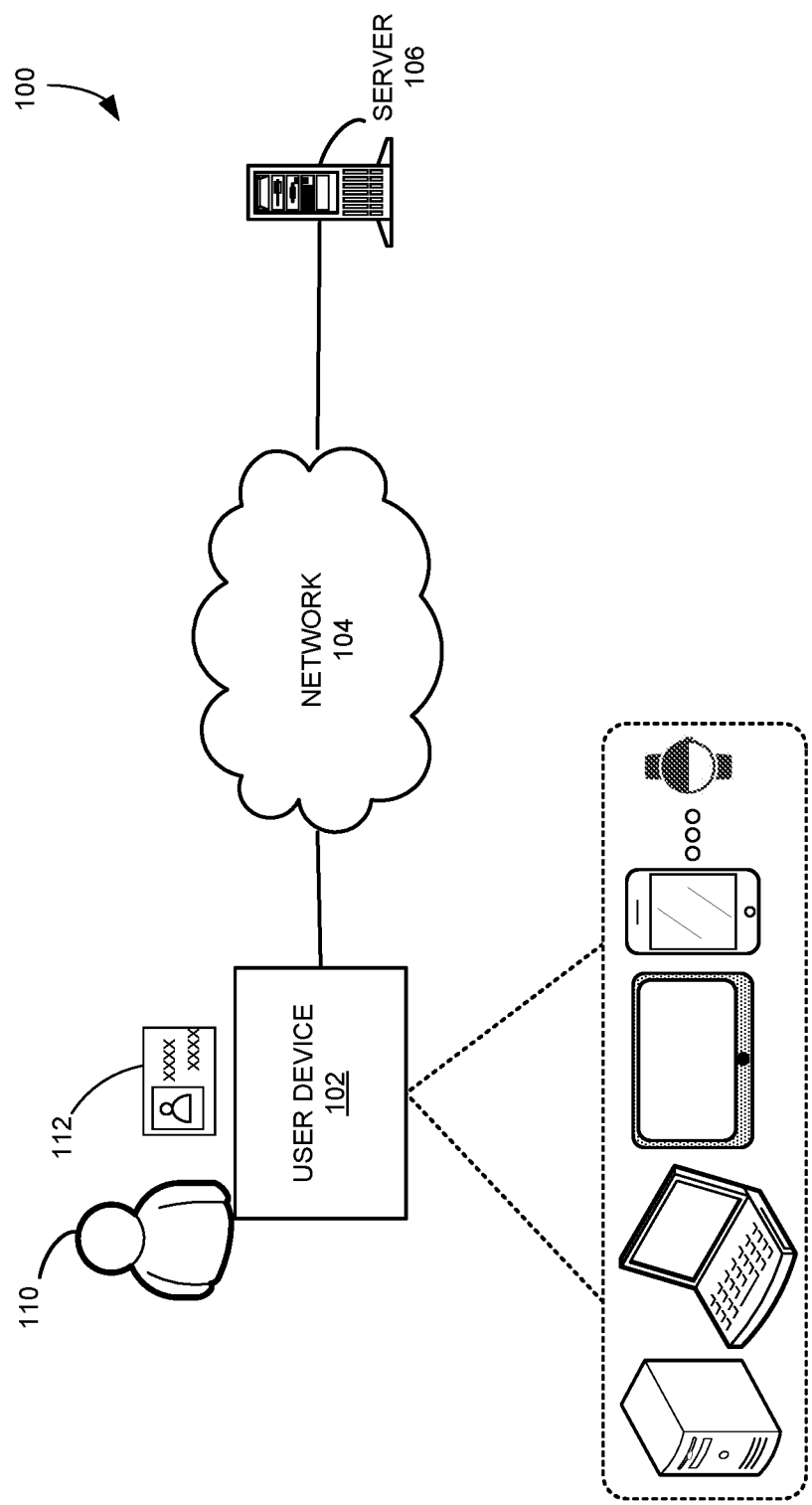
FIG. 1 shows an exemplary computing environment, according to one embodiment.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the embodiments described herein are not limited to the embodiments shown, but are to be accorded the widest scope consistent with the principles and features disclosed herein.

Overview

The embodiments described herein solve the technical problem of automatically determining whether an image provided by a computing device is an image of an original physical entity or object (e.g., a photo ID) or an image of an electronic or paper copy of a physical entity or object. More specifically, while the camera associated with the computing device is capturing the image, the computing device can configure an environment where the physical object is located (e.g., configuring the camera in such a way that the camera captures the image under a strong flash). Because optical reflective properties of the physical object and its electronic or paper copy are different, their respective images can be different. Various machine-learning techniques, such as Support Vector Machines (SVMs) and deep-learning neural networks, can be used to determine the authenticity of the image (i.e., determining whether the image is captured from a physical object or an electronic/paper copy of the physical object).

Objects typically can have specific compositions or forms, which are often associated with the environmental factors of the environment they are in. The compositions can include both physical and chemical compositions, and the forms can include the shapes and phases exhibited by the objects. Using a plastic photo ID as an example, when illuminated by visible light, the form of the plastic photo ID can be solid and a thin slice; its exterior surface can include specific grain structures or colors resultant from the fabrication process or the plastic material. On the other hand, when illuminated by ultraviolet light, new grain structures or colors may appear on the exterior surface of the plastic ID, although its form remains a solid, thin slice. Moreover, an artifact made of ice may remain in solid form when the temperature is below 0° C. The same artifact will be in liquid form if the temperature rises to above 0° C., and will be in gas form if the temperature is above 100° C.

To-be-identified objects can include physical and non-physical objects. In this disclosure, physical objects can include artifacts, users, plants, or animals, etc. Non-physical objects can include imitation or forged copies of the physical objects, which can appear similar to the physical objects. For example, if a physical object is an ID card, its corresponding non-physical object can be a photocopy or an electronic copy (e.g., as displayed on a computer screen) of the ID card.

The environment can be a spatial region where the to-be-identified object exists, including an enclosed or non-enclosed spatial region. The environmental factors can be used to indicate characteristics of the environment, including at least one of: lighting, temperature, humidity, pressure, sound, magnetic field, electrical field, vacuum condition, etc.

Solutions provided by embodiments of the present invention can be used for determining, by electronic devices, whether a to-be-identified object is a physical object or a forged copy. In other words, such solutions can be used for authenticating the to-be-identified object. Such techniques can be used in security monitoring or screening scenarios. They can also be used in scenarios where images of a physical object (e.g., an ID card) are required by service providers in order to identify the physical object before providing services.

Because a physical object and its imitation or forged copy (also referred to as the corresponding non-physical object), although similar, are two different objects, they can have different compositions and forms. As a result, when placed within a particular environment (e.g., an environment with target environmental factors), the physical object and its corresponding non-physical object can have different compositions or forms associated with the target environmental factors. Therefore, one can determine whether a to-be-identified object is a physical object or non-physical object based on its composition or form associated with the target environmental factors. One intuitive way to show the composition or form of the to-be-identified object associated with the target environmental factors is to capture images of the to-be-identified object in an environment with the target environmental factors. The features of the captured images can reflect the composition or form of the to-be-identified object. Therefore, an automated system can use these features to identify the to-be-identified object, obviating the need for manual labor or experience, thus significantly enhancing the accuracy and reliability of the object-identification process.

Embodiments of the present invention can be implemented as a client or a plug-in. A computing device can download the client or plug-in from a remote server and install such a client or plug-in. By running the client or plug-in, the computing device can perform the physical-object identification or authentication method. It is also possible for the program or plug-in to reside on the remote server, and the computing device can access the server to obtain the physical-object identification or authentication service.

The computing device for physical-object identification and authentication can include, but is not limited to: smartphone, smartwatch, virtual-reality (VR) equipment, tablet computer, laptop computer, in-vehicle computers, desktop computer, set-top boxes, smart TVs, wearable devices, surveillance devices, security-inspection devices, etc. Such a computing device can include a camera for capturing images, can be coupled to a camera via a network in order to obtain captured images, or can receive images from other devices. The computing device can communicate with a remote server to obtain client, plug-in, physical-object identification service, etc.

The client can include at least an application. The application can run on the computing device to perform the task of physical-object identification. The plug-in can be included in an application running on the computing device.

Physical-Object Identification

FIG. 1 shows an exemplary computing environment, according to one embodiment. Computing environment 100 can include a user device 102, a network 104, and a server 106. A user 110 can use user device 102 to access the physical-object identification or authentication service (e.g., identifying physical object 112). Examples of user device 102 can include, but are not limited to, a desktop, a laptop, a tablet, a smartphone, and a wearable device (e.g., a smartwatch). In some embodiments, user device 102 can either include or couple to a camera (not shown in FIG. 1), which can be used for capturing images of physical object 112. In some embodiments, the physical-object identification service can be provided by user device 102. In further embodiments, the physical-object identification service can be provided by server 106, and user device 102 can couple to server 106 via network 104, which can be a local area network (LAN) or a wide area network (WAN) (e.g., the Internet).

In order to identify or authenticate a physical object, at least one image of the to-be-identified object is captured. FIG. 2A shows an image-capturing setup, according to one embodiment. In FIG. 2A, a to-be-identified object (e.g., an ID) 202 can be placed vertically, and a computing device (e.g., a tablet computer) 204 can be placed with its camera parallel to to-be-identified object 202. An image of to-be-identified object 202 can be captured by the camera. Note that, in FIG. 2A, to-be-identified object 202 is shown as a physical ID. In practice, to-be-identified object 202 can be a paper or electronic copy of the physical ID. For example, a fraudulent user may use computing device 204 to take a picture of an image of the physical ID displayed on another computing device.

Figure 2B:
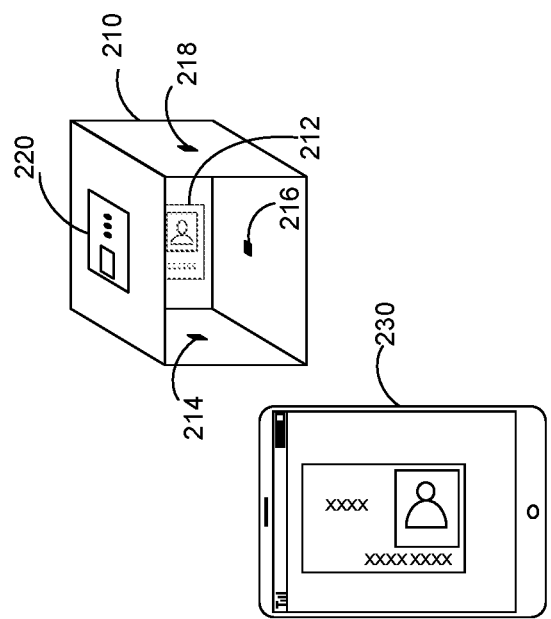
FIG. 2B shows an image-capturing setup, according to one embodiment.
Figure 2A:
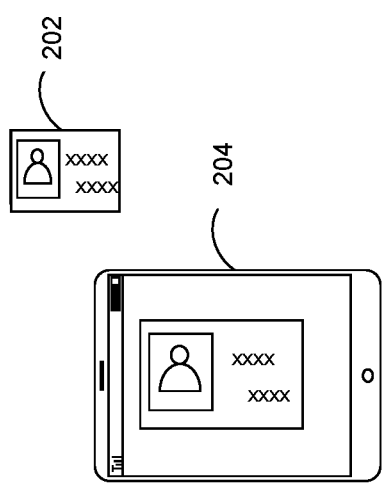
FIG. 2A shows an image-capturing setup, according to one embodiment.

FIG. 2B shows an image-capturing setup, according to one embodiment. In FIG. 2B, to-be-identified object 212 can be placed inside a target-environment-release apparatus 210, which can include a physical enclosure. Within the physical enclosure, a controlled environment having target environmental factors can be provided. The interior walls of target-environment-release apparatus 210 can include a number of environment-control modules, such as modules 214, 216, and 218. These environment-control modules can include a light-emitting module, a temperature-control module, a humidity-control module, an air-pressure-control module, etc. Target-environment-release apparatus 210 can also include a control panel 220 that allows a user to control the various environment-control modules.

In some embodiments, target-environment-release apparatus 210 can be coupled, via a wired or wireless network, to other computing devices, such as computing device 230. Target-environment-release apparatus 210 can receive control commands from computing device 230. For example, a user can control environment-control modules 214-218 by sending control commands via computing device 230. Once target-environment-release apparatus 210 has been configured in such a way that to-be-identified object 212 is exposed to target environmental factors, a camera associated with computing device 230 can capture an image of to-be-identified object 212. In alternative embodiments, target-environment-release apparatus 210 may also include a camera for capturing images of to-be-identified object 212 within the target environment.

Figure 3:
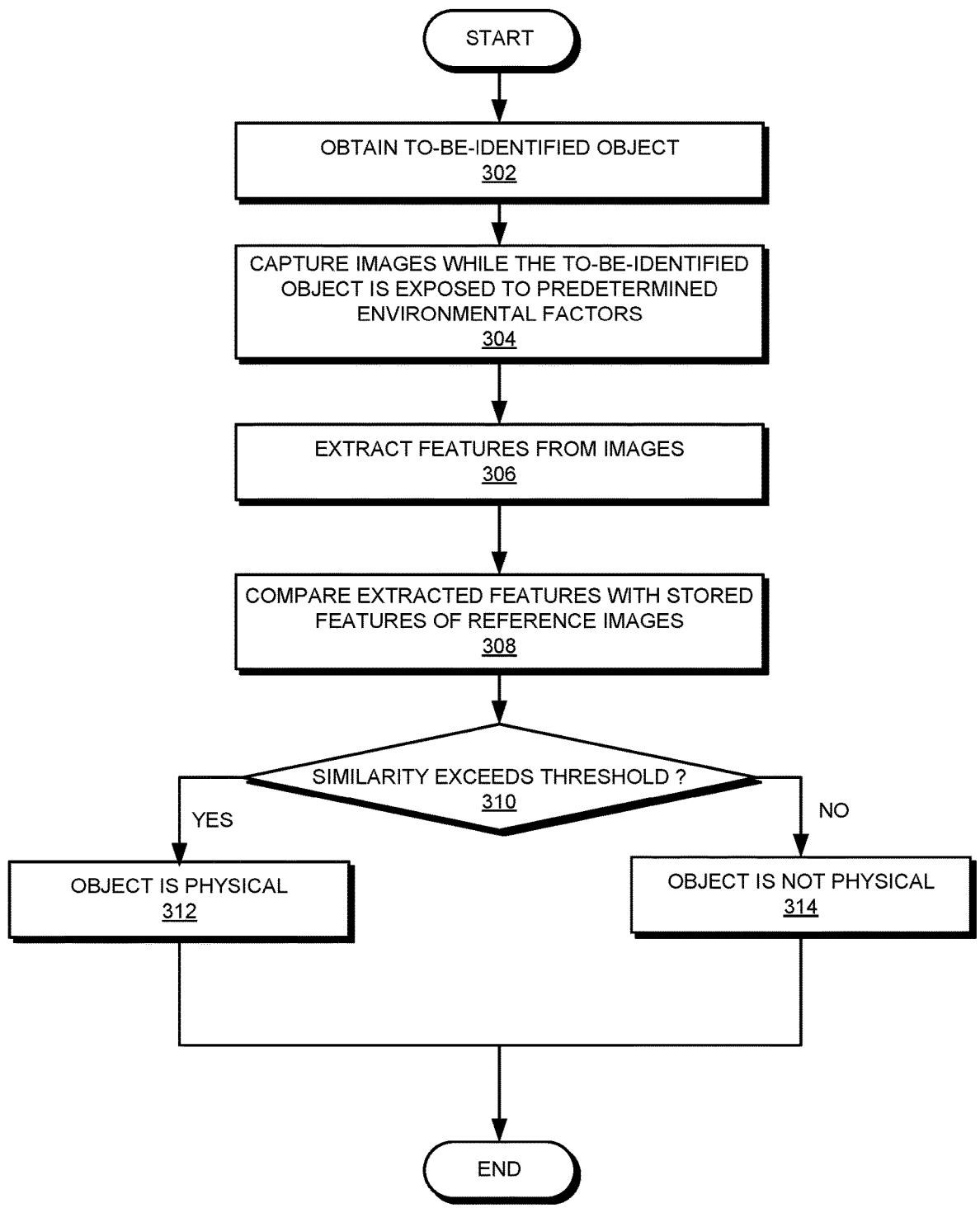
FIG. 3 presents a flowchart illustrating an exemplary process for identifying an object, according to one embodiment.

FIG. 3 presents a flowchart illustrating an exemplary process for identifying an object, according to one embodiment. During operation, a to-be-identified object is obtained (operation 302). For example, when a user attempts to open a mobile phone account remotely, the mobile service provider may prompt the user to provide proof of his identification. In response, the user may need to provide a live image of his government-issued ID. In an alternative example, a user may wish to use the physical-object identification service to identify or authenticate a physical object. Note that, in this disclosure, to identify or authenticate a physical object refers to the process of determining whether a to-be-identified object is indeed a real physical object or a forged copy of the physical object.

Subsequently, the system captures one or more images of the to-be-identified object while the to-be-identified object is exposed to a set of predetermined environmental factors (operation 304). Note that, because different objects may exhibit different compositions or forms and a particular object may exhibit a composition or form associated with the environmental factors that the object is exposed to, determining the composition or form of an object exposed to certain environmental factors can be useful in identifying or authenticating the object. The composition or form of a to-be-identified object can often be reflected by features extracted from its image. Hence, for accurate identification or authentication of the to-be-identified object, the system can capture an image or multiple images of the to-be-identified object while the object is exposed to predetermined target environmental factors. For example, under a strong lighting condition (e.g., under a strong flash), objects made of different materials (e.g., plastics or paper) can exhibit different reflection properties. Therefore, it is possible to distinguish these objects by taking pictures of them under strong flashes.

In some embodiments, capturing the images can include capturing one or more of: visible-light images, infrared-light images, x-ray images, or ultrasound images. The ability to capture diverse forms of images can enhance the accuracy in identifying the object.

The system can then extract features from the captured images (operation 306). In some embodiments, the system can extract, from a captured image, at least one of: a median pixel value, a median RBG value, and a median grayscale value, of all regions within the image, and use the extracted value as the feature of the captured image. Alternatively, the system can divide a captured image into multiple regions; for each region, the system can determine, based on at least one of: a median pixel value, a median RBG value, and a median grayscale value, the region's color, texture, and brightness. The system can then use at least one of the determined color, texture, or brightness of the different regions as features of the image. As disclosed previously, the to-be-identified object can have a particular composition or form associated with the particular environmental factors that it is exposed to, such as its exterior shape, color, texture, or brightness. Consequently, the composition or form of the to-be-identified object can be reflected by features of its images, such as the color, texture, or brightness. Therefore, the object can be identified based on features extracted from its images.

In some embodiments, the system can capture, beforehand, images of known physical objects while the known physical objects are exposed to the target environmental factors, and extract and store features of these images. The stored features of images of known physical objects can later be used as references for identification of to-be-identified objects. For example, the system can capture images of authentic IDs under strong flashes, extract features from these images, and store the features of these images. The stored features can later be used to compare to features of images of a to-be-identified ID in order to determine whether the to-be-identified ID is a physical object.

Subsequently to extracting features from the captured images, the system can compare the extracted features with the stored features of reference images (operation 308). In some embodiments, the system can determine whether a similarity between the extracted features and the reference features exceeds a predetermined threshold (e.g., 75%) (operation 310). If so, the system determines that the to-be-identified object is a physical object (operation 312). If not, the system determines that the to-be-identified object is a non-physical object (operation 314).

In the case of a to-be-identified object being a government-issued ID, the predetermined environmental factors can be illumination conditions, including both wavelength and intensity of the light. For example, while capturing images of the to-be-identified ID (which can be the real ID or an electronic or paper copy of the real ID), the system can configure the environment by shining light of a particular wavelength and intensity on the to-be-identified ID. A captured image can be divided into multiple regions, and the color and texture of each region can be viewed as the features of the image. By comparing the color and texture of the different regions of the captured image to those of a previously obtained reference image, the system can determine the similarity between features of the two images. If the similarity is about 80%, greater than the 75% threshold, the system can determine that the color and texture of the to-be-identified object illuminated by light with a particular wavelength and intensity are similar to the color and texture of a physical ID illuminated by similar light. Therefore, the to-be-identified object is a genuine physical ID. Note that a paper copy of the ID reflects light differently from the physical ID. Similarly, an electronic copy of the ID (e.g., an image of the ID displayed on a computer screen) also reflects light differently from the physical ID. More specifically, under a strong flash, the computer screen often exhibits a highly reflective spot, resulting in the captured image having an extremely bright spot.

In the previous example, the predetermined target environmental factors include illumination conditions, and the system can simultaneously adjust the environmental factors and capture the one or more images. For example, a camera can capture images with flash on. In alternative examples, the environmental factors can include other types of factors, whose target values cannot be achieved instantaneously. For example, it can take time for the temperature or humidity of the environment to reach the desired settings. In some embodiments, the target environmental factors need to be achieved prior to capturing the images.

Figure 4:
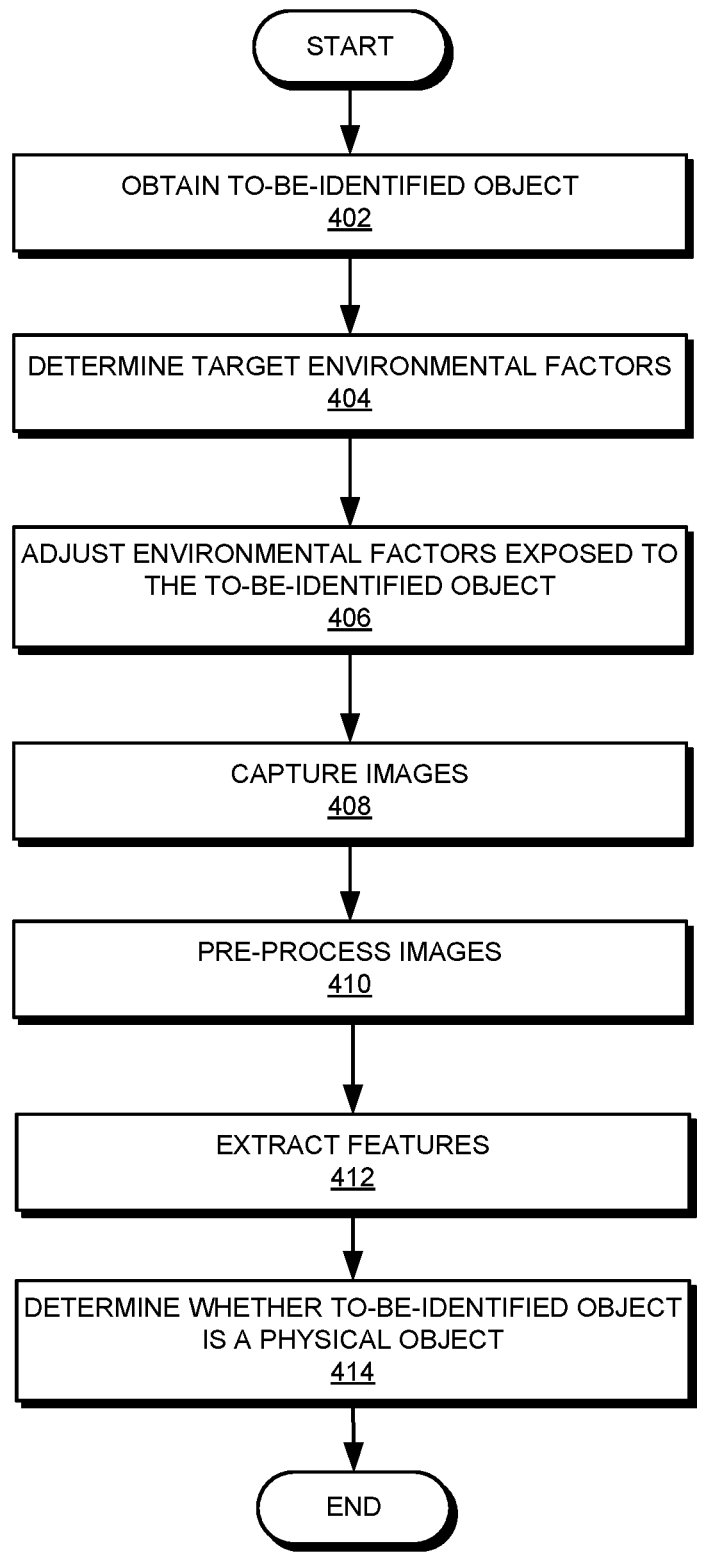
FIG. 4 presents a flowchart illustrating an exemplary process for identifying an object, according to one embodiment.

FIG. 4 presents a flowchart illustrating an exemplary process for identifying an object, according to one embodiment. During operation, the system obtains a to-be-identified object (operation 402). In some embodiments, the to-be-identified object may be characterized. Based on the characterization of the to-be-identified object, the system can determine a set of target environmental factors (operation 404). As discussed previously, if the to-be-identified object is an ID or an object that has different visual appearances under different illumination conditions, the system can determine that the target environmental factors can include illumination conditions. On the other hand, if the to-be-identified object includes portions with different thermal capacity, meaning the different portions may rise to different temperatures when being heated, the system can determine that the target environmental factors can include an elevated temperature. Alternatively, if the to-be-identified object is magnetic (e.g., a compass), the target environmental factors may include magnetic field strength and distribution.

Subsequently, the system adjusts environmental factors to which the to-be-identified object is exposed in order to achieve the target environmental factors (operation 406). In some embodiments, the system can be equipped with various sensors (e.g., light sensors, temperature sensors, humidity sensors, pressure sensors, etc.) that can measure the current environmental factors to which the to-be-identified object is exposed. If the current environmental factors are different from the target environmental factors, the system can adjust the environmental factors until the target values are achieved. In some embodiments, adjusting the environmental factors can involve controlling one or more environmental control modules (e.g., a lighting system, a sound system, a heater, a cooling module, etc.).

Note that, regardless of its composition or form, the to-be-identified object will reflect light, and features of images formed by the reflected light may indicate the composition or form of the to-be-identified object. In some embodiments, in order to ensure the reliability of the features extracted from the captured images, the system needs to carefully control the illumination condition, which can include angle, wavelength, and intensity of the light. In further embodiments, controlling the illumination condition can involve controlling a light source, such as florescent or LED lamps, screens or displays, or torches. The light source may also include natural light sources, such as the sun, the moon, or fluorite materials. Adjusting the lighting angle may involve adjusting the relative positions between the light source and the to-be-identified object. The wavelength of the incident light can include infrared, visible light, and ultraviolet light. In some embodiments, one can also adjust the number of light sources in order to adjust the illumination condition. In most cases, the to-be-identified object is in an environment with an existing light source (e.g., the sun or lighting in the room) that can be hard to eliminate or filter; hence, to achieve a desired illumination condition, one may need to add one or more additional light sources. An additional light source can be different from the existing light source in at least one of: angle, wavelength, and intensity. In one embodiment, a flash (either an internal or external flash) of a camera can be used as the additional light source. The system can automatically turn on the flash while capturing images of the to-be-identified object. For example, if the physical-object-identification system comprises a smartphone, a specially designed application or plug-in installed on the smartphone can be used to control the operation of the internal or external flash of the smartphone.

In order to control the humidity factor, the system may use a humidifier or de-humidifier to control the water content within the environment. In order to control the air pressure factor, the system may control a pressure valve or regulator. In order to control the sound factor, the system may control the number and position of sound sources. The system may further control the wavelengths of the sound sources. In further embodiments, to accurately adjust the environmental factors, the system may transfer the to-be-identified object from its current location to a different location where it can be exposed to target environmental factors. For example, the system may transfer the to-be-identified object into a physical enclosure with environmental control. In some embodiments, the system can include various automatic transfer mechanisms, such as robotic arms, rollers, conveyor belts, that can transfer the to-be-identified object. In alternative embodiments, the system may send prompts to the user, instructing the user to transfer the to-be-identified object to a specified location or environment. The user prompts can be in the form of sound, text, or vibration.

Subsequent to exposing the to-be-identified object to the target environmental factors, the system can capture one or more images of the to-be-identified object (operation 408). The system can further pre-process the captured images (operation 410). Pre-processing a captured image can include rotating or cropping the image. Because a camera may vibrate or be slightly out of focus while capturing an image, the captured image can be blurry. Moreover, the captured image may include content in addition to the to-be-identified object. Pre-processing the image can include correcting the image to reduce blurriness caused by camera motions and cropping the image to eliminate the additional content. In some embodiments, the system can rotate the captured image such that the to-be-identified object in the captured image can have a predetermined orientation. For example, if the to-be-identified object is a picture ID, pre-processing an image comprising the picture ID can involve cropping the image to obtain an image containing only the picture ID and, if needed, rotating the image so that the picture ID is oriented upright.

In some embodiments, pre-processing the images can involve applying machine-learning techniques (e.g., applying a deep-learning neural network). For example, a previously trained neural network can recognize and locate a to-be-identified object (e.g., a picture ID) within a captured image. Based on the location and orientation of the to-be-identified object within the captured image, the system can rotate and/or crop the captured image accordingly. Training of the deep neural network can involve using sample images of known physical objects. Alternatively, pre-processing the images can involve a more standard image-processing technique, such as selecting a predetermined center portion of the image to crop and adjusting the contrast and/or brightness of the image.

Subsequent to pre-processing the captured images, the system can extract relevant features from the captured images (operation 412), and determine whether the to-be-identified object is a physical object based on the extracted features (operation 414).

Note that not all features of an image of the to-be-identified object are influenced by the target environmental factors. Therefore, only features that can be influenced by the target environmental factors will be extracted and considered during the object-identification process. For example, a portion of the exterior surface of a physical object corresponding to a to-be-identified object may exhibit a special color when illuminated by light of a particular wavelength. Accordingly, the system can capture an image of the to-be-identified object under the illumination of such light, and use the color, texture, and brightness of that particular portion of the to-be-identified object as the relevant features of the image. These relevant features can then be used to determine whether the to-be-identified object is the physical object. For example, a genuine paper currency may include a particular printed element that is only visible under UV illumination. Hence, the system can capture an image of a to-be-identified paper currency under UV illumination and extracts the color features of the region where the particular printed element is located in the image. The extracted color features can then be sent to a machine-learning module, which can then determine whether the to-be-identified paper currency is genuine or a paper copy.

In a different example, a physical object corresponding to a to-be-identified object may be composed of different portions having different thermal capacities; as a result, when heated, the different portions can have different temperatures. An infrared image of the to-be-identified object may indicate the temperature distributions. Hence, the color, texture, and/or brightness of the different regions of the IR image can be used as features for determining whether the to-be-identified object is a physical object. Similarly, for an object that includes loose magnetic parts (e.g., a compass), because the loose magnetic parts may change position or orientation under a magnetic field, the system can capture an image of the to-be-identified object under the magnetic field and use the color, texture, and/or brightness of the regions of the image corresponding to the magnetic parts as features for determining whether the to-be-identified object is a physical object.

In some embodiments, the system can obtain, from a captured image, a predetermined region corresponding to the to-be-identified object. Obtaining the predetermined region can involve cropping and/or rotating the captured image. The system can use at least one of: pixel values, RBG values, and grayscale values to determine the color, texture, and/or brightness of the predetermined region of the captured image; and then use the color, texture, and/or brightness of the predetermined region as the features of the captured image for determining whether the to-be-identified object is a physical object.

In some embodiments, when determining, based on features of a captured image of a to-be-identified object, whether the to-be-identified object is a physical object, the system can apply a machine-learning technique. For example, the system can use a previously trained deep-learning neural network (e.g., a convolutional neural network) to determine whether a to-be-identified object is a physical object based on relevant features of one or more images of the to-be-identified object. In addition to neural networks, other machine-learning techniques, such as support vector machines (SVMs), can also be used as a classifier to classify features of images in order to determine whether a to-be-identified object is a physical object. Note that training of the neural networks or SVMs can involve obtaining sample features of images of known physical objects.

In some embodiments, instead of image features, the input of the machine-learning models (e.g., the deep neural networks or SVMs) can be the pre-processed image or the original image itself. In this scenario, training of the neural networks or SVMs can involve sample images of known physical objects.

In some embodiments, to obtain more accurate object-identification results, the system may obtain images of the to-be-identified object under different conditions. For example, the system may first obtain an image of the to-be-identified object within its natural environment, and then obtain an image of the to-be-identified object when it is exposed to the target environmental factors. The system can then obtain the difference between the two images and determine whether the to-be-identified object is a physical object.

Figure 5:
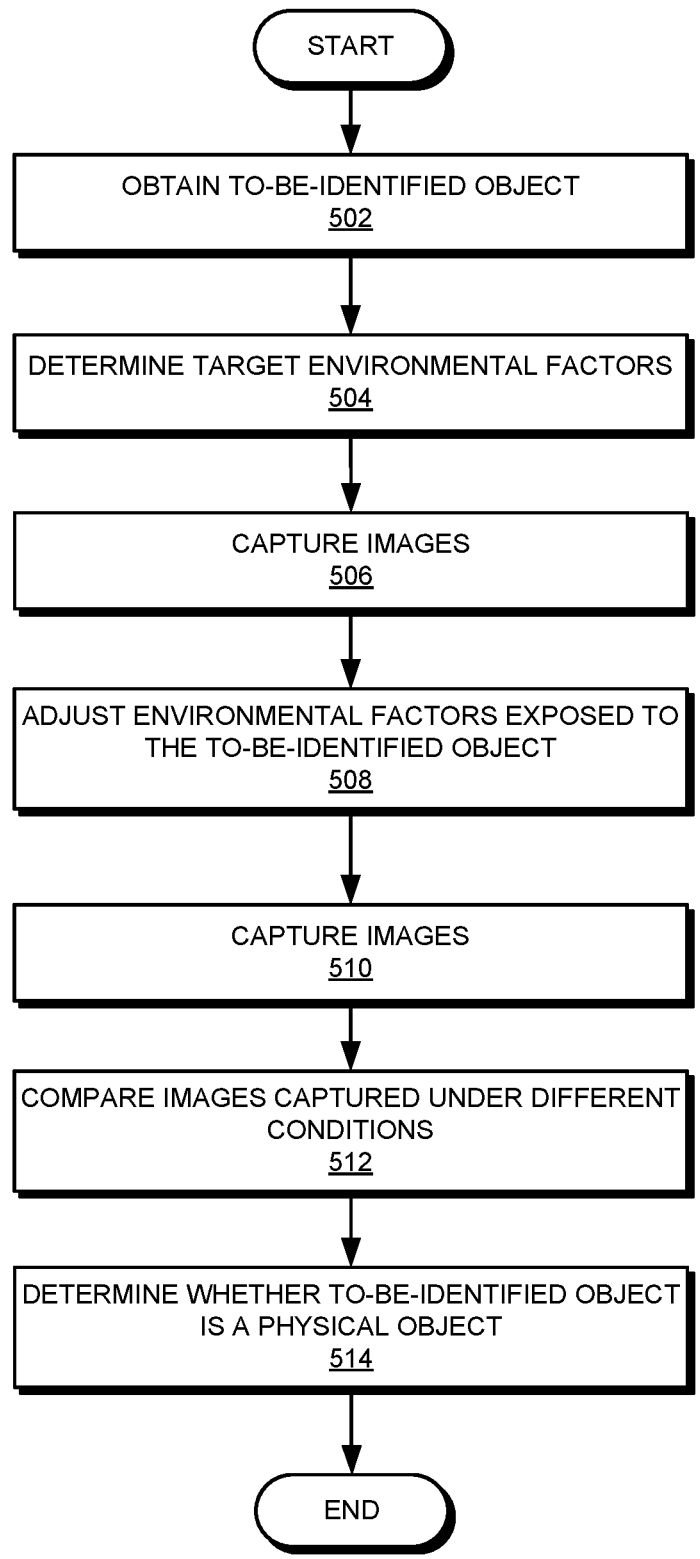
FIG. 5 presents a flowchart illustrating an exemplary process for identifying an object, according to one embodiment.

FIG. 5 presents a flowchart illustrating an exemplary process for identifying an object, according to one embodiment. During operation, the system obtains a to-be-identified object (operation 502). In some embodiments, the to-be-identified object may be characterized. Based on the characterization of the to-be-identified object, the system can determine a set of target environmental factors (operation 504). For example, if the physical object corresponding to the to-be-identified object is a government-issued ID, the target environmental factors can include illumination conditions. On the other hand, if the to-be-identified object includes a component that may change its appearance when the temperature changes, the target environmental factors can include a target temperature. For example, a physical object corresponding to the to-be-identified object can be a double-wall ceramic mug with colorful volatile material between the double walls. When the temperature of the mug walls exceeds a predetermined temperature (e.g., 60°), the colorful volatile material turns gaseous, and a transparent window on the mug wall will display a specially designed pattern. Therefore, by heating the to-be-identified object to the predetermined temperature, by capturing an image of the heated to-be-identified object, and by extracting features of the image associated with the area where the transparent window is located, the system can determine whether the to-be-identified object is a genuine product or a counterfeit. In a different example, the physical object corresponding to the to-be-identified object is a government-issued ID with a thermally sensitive anti-counterfeit label, which remains flat under normal temperature, and will expand and rise above the surface of the ID when heated. Similarly, the system can determine whether the ID is genuine or fake by heating and capturing images of the to-be-identified object.

The system can capture one or more images of the to-be-identified object under the current, unadjusted environmental condition (operation 506). In other words, the system can capture images of a to-be-identified object when the object is in its natural environment. For example, the to-be-identified object can be under normal lighting (e.g., sunlight or standard room light) or temperature (e.g., room temperature) conditions when the images are captured. As disclosed previously, changes in environmental factors can cause the composition and form to change. For example, if the incidence angle of the light changes, the intensity of light reflected by a to-be-identified object can change; if the wavelength of the incident light changes, the color of the reflected light or the light refraction/diffraction patterns can change; and for certain materials, if the temperature changes, the color of reflected light may change. For a physical object and a corresponding non-physical object, the same amount of change in environmental factors may result in different changes in their compositions and/or forms. Hence, by comparing the changes in image features, which can reflect changes in composition and/or forms, the system can distinguish between a physical object and a non-physical object.

Subsequent to capturing images of the to-be-identified object under a normal, un-adjusted condition, the system can adjust environmental factors to which the to-be-identified object is exposed (operation 508). In some embodiments, the system can monitor current environmental factors that are relevant to object identification and adjust these environmental factors to achieve target environmental factors. For example, if the target environmental factors include an illumination condition, achieving the target environmental factors may involve adjusting the number, locations, and angle of the light sources. A to-be-identified object may include multiple facets facing different directions, and incident light of different angles may be reflected by different facets, resulting in captured images of the to-be-identified object having different image features. Therefore, to ensure that incident light illuminates the area of interest on the to-be-identified object, the system may need to adjust the relative position between the light source and the to-be-identified object, which may involve either moving the light source or the to-be-identified object. More particularly, if the to-be-identified object is bulky and difficult to move, the system may adjust the location of the light source. If multiple light sources are present, the system may configure the multiple light sources in such a way that the combined illumination condition matches the target illumination condition. Alternatively, the light source can be attached to an automated conveyor system, and the system can control the conveyor system to move the light source to a desired location and/or orientation. Similarly, it is also possible to place the to-be-identified object onto an automated conveyor system such that the to-be-identified object can be transferred to a desired location. In some embodiments, in order to ensure sufficient illumination on an interested area of the to-be-identified object to prevent poor image quality, the system can adjust the relative position between the light source and the to-be-identified object in such a way that an angle formed between the incident light and the image-capturing direction is less than 90°. For other types of environmental factors (e.g., temperature or humidity), the system may need to adjust a corresponding temperature or humidity control module.

Once the target environmental factors have been achieved, the system can capture one or more images of the to-be-identified object exposed to the target environmental factors (operation 510). The system can compare an image captured under the normal condition and an image captured under the target environmental factors to obtain image-difference information, which indicates the difference between these two images (operation 512). Such image-difference information can intuitively indicate the influence on the composition and/or form of the to-be-identified object by the target environmental factors. Therefore, compared to the approach where only images of the to-be-identified object exposed to target environmental factors are captured, this differential approach can further enhance the object-identification accuracy. In some embodiments, a differential image can be obtained by subtracting pixel values of one image from corresponding pixel values of the other. Note that the system may pre-process captured images (e.g., cropping and/or rotating) before generating the differential image. For example, if the to-be-identified object is a picture ID, the system can crop and rotate the captured images in such a way that each image includes only the picture ID having a predetermined orientation. In some embodiments, pre-processing the captured images can involve applying a machine-learning technique to recognize and track the to-be-identified object within the captured images.

Subsequently, the system can determine whether the to-be-identified object is a physical object based on the obtained image-difference information (operation 514). In some embodiments, the image-difference information can refer to the differential image itself. In alternative embodiments, the image-difference information can refer to features extracted from the differential image. The image-difference information can be sent to a machine-learning module (e.g., a deep neural network or an SVM classifier), which can generate an output indicating whether the to-be-identified object is a physical object. Training of the machine-learning module can involve obtaining a number of training samples by capturing images of a known physical object under various environmental conditions.

Figure 6:
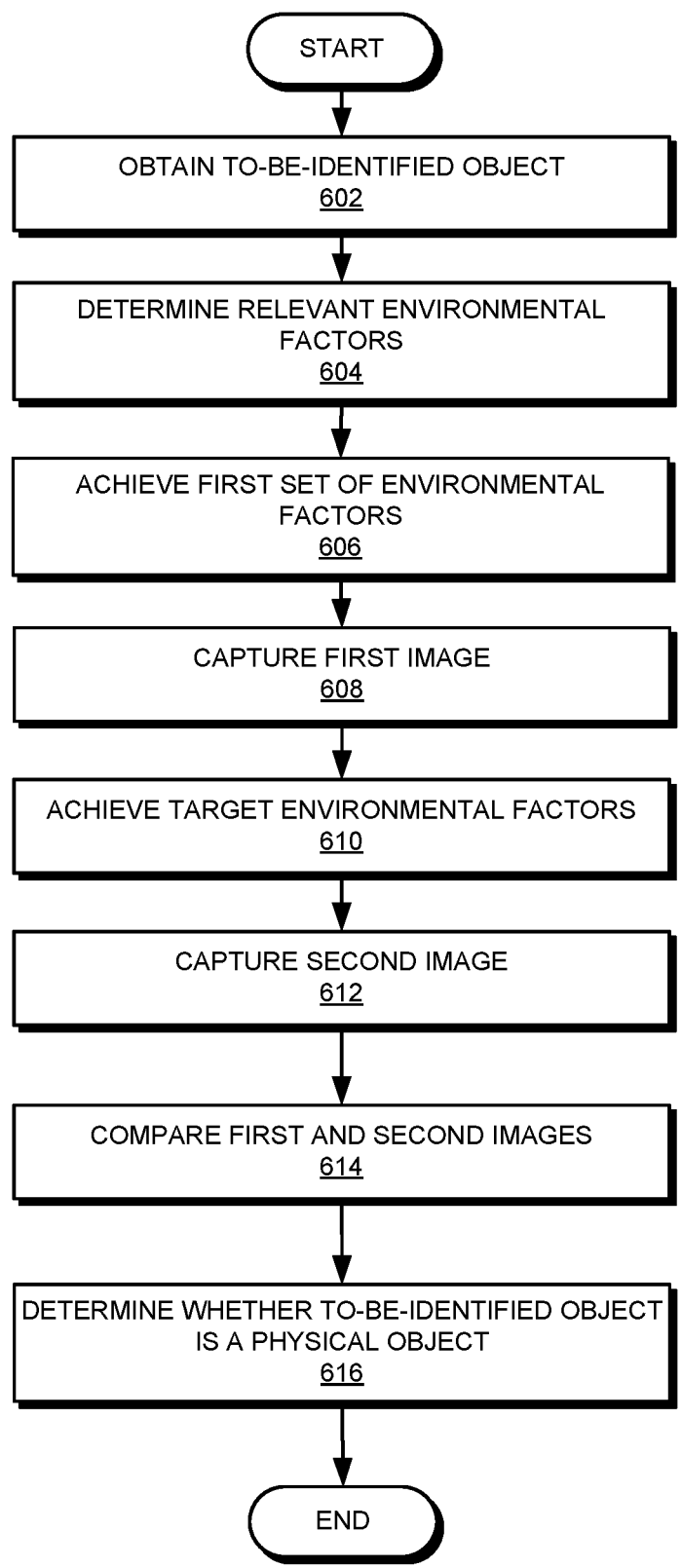
FIG. 6 presents a flowchart illustrating an exemplary process for identifying an object, according to one embodiment.

In the example shown in FIG. 5, the system first captures an image of the to-be-identified object under a natural, unadjusted environment. However, this can lead to uncertainty in the captured images, because the natural environment can change. For example, the lighting or illumination conditions can be different for day and night, and the temperature conditions can also change due to change of seasons. Such an uncertainty means that a large number of training samples will be needed to train the machine-learning module. To simplify the training process, in some embodiments, the system may capture a first image when the to-be-identified object is exposed to a first set of environmental factors (which are different from the target environmental factors). FIG. 6 presents a flowchart illustrating an exemplary process for identifying an object, according to one embodiment. During operation, the system obtains a to-be-identified object (operation 602) and determines a set of relevant environmental factors (operation 604). Depending on the category of the to-be-identified object, the relevant environmental factors can include, but are not limited to: illumination conditions, temperature, humidity, air pressure, electrical or magnetic field distribution, etc. The system adjusts the relevant environmental factors to achieve a first set of environmental factors, to which the to-be-identified object is exposed (operation 606) and captures a first image of the to-be-identified object (operation 608). Subsequent to capturing the first image, the system adjusts the relevant environmental factors to achieve the target environmental factors (operation 610) and captures a second image of the to-be-identified object when it is exposed to the target environmental factors (operation 612). The system can then compare the first and second images to obtain image-difference information (operation 614) and then determine whether the to-be-identified object is a physical object based on the image-difference information (operation 616).

By capturing images of the same object under different environmental conditions and by comparing the images, embodiments of the present invention can distinguish between objects that may appear similar, such as a physical object and its counterfeit. More specifically, machine-learning techniques can be used to determine whether an object is a physical object or its counterfeit based on the captured images. In addition, well-trained machine-learning modules can also be used to recognize an object included in a captured image. For example, depending on the captured image, the system can determine whether a picture ID included in the image is a driver's license, a passport, or an identification card. The ability to recognize the object within the picture allows the system to select environmental factors that are relevant to the recognized object. For example, some objects can be more sensitive to lighting, whereas other objects can be more sensitive to temperature.

User Authentication

Figure 7:
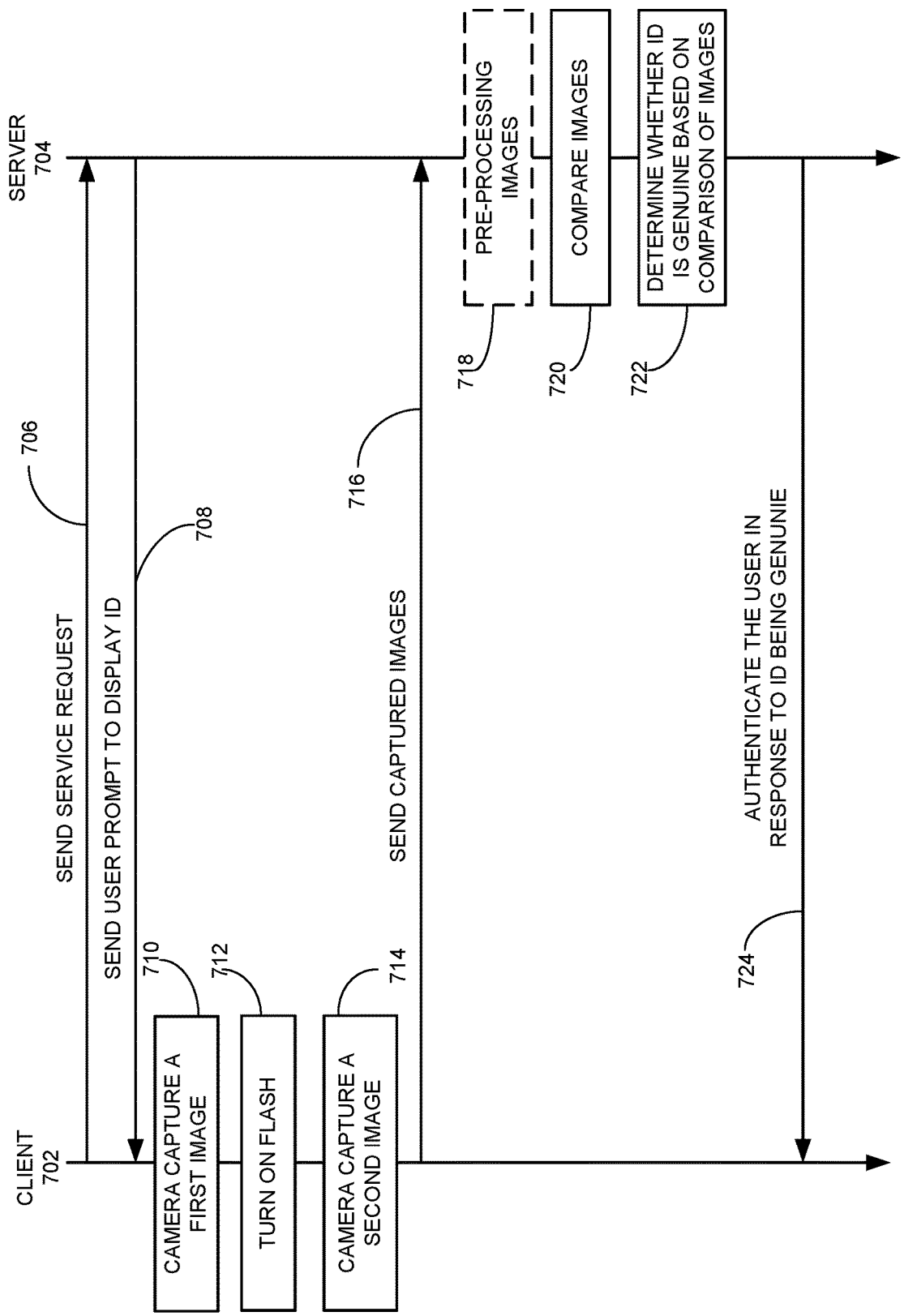
FIG. 7 shows an exemplary user-authentication process, according to one embodiment.

The physical-object identification or authentication ability provided by embodiments of the present invention can also be used for user authentication. For example, when a user attempts to remotely access, via a client machine, a service provided by the server (e.g., opening an account), the server may request the user to prove his identity. In daily life (e.g., at an airport security check or at a bank counter), a user can prove his identity by showing his ID, and a human can check whether his ID is genuine. However, remote authentication of an ID can be a challenge. In some embodiments, the server can request the user to display his government-issued ID in front of a camera associated with the client machine such that the camera can take a still image or live video of the ID; and the client machine can send the image or video to the server. The server can then determine whether the ID is genuine based on the received image or video in order to authenticate the user. To distinguish between an image of a real ID and an image of a paper or electronic copy of the real ID, the client machine may need to configure the camera in such a way that images can be taken under different illumination conditions, and comparison of the images can indicate whether the ID displayed by the user is a real ID or a paper or electronic copy of the real ID. FIG. 7 shows an exemplary user-authentication process, according to one embodiment.

During operation, a client 702 can send a service request to a server 704 (operation 706). In response to the service request, server 704 sends a user prompt to client 702, prompting the user to display a government-issued ID in front of a camera associated with client 702 (operation 708). In some embodiments, sending the user prompt to client 702 can include displaying a user interface on client 702, which can include an image-display area; and the user can be prompted to arrange the camera such that images of the government-issued ID can be shown in the image-display area. Note that the camera can be an internal camera of client 702 or an external camera coupled to client 702, and displaying the ID in front of the camera may involve the user adjusting the position of the camera, the ID, or both.

The camera can then capture at least a first image of the ID (operation 710). Note that no additional adjustment to the current environmental factors is performed while the camera captures the first image. In other words, the camera may capture the first image of the ID in as-is condition. More specifically, the camera may capture the first image under the current lighting and/or temperature conditions. If the camera captures a video stream, a frame can be extracted from the captured video stream as the first image.

Subsequent to capturing the first image, client 702 can turn on a camera flash (either an internal flash of client 702 or an external flash coupled to client 702 (operation 712) and capture a second image of the ID while shining a strong flash on the ID (operation 714). Note that the camera flash is not manually configured by the user; instead, a user-authentication application running on client 702 may automatically configure the camera flash. In some embodiments, the setting of the camera flash (e.g., light intensity and angle) can also be automatically configured by the user-authentication application. In addition to a camera flash, other types of light sources can also be used to shine a strong light (e.g., a light with a predetermined intensity and/or predetermined spectrum) onto the ID while the second image is captured. Similarly, if the camera captures a video under the strong light, a frame from the video can be extracted as the second image. Because a physical ID and an electronic copy of the physical ID (e.g., an ID displayed on a computer screen) have different light-reflection properties, their corresponding images under the camera flash can be different.

In some embodiments, a time delay between capturing the two images is kept to a minimum in order to ensure that the ID remains in substantially similar location and orientation. In an ideal situation, the relative position and orientation between the camera and the ID can remain unchanged when these two images are captured. In some embodiments, in addition to configuring configure the camera flash, the user-authentication application can also configure a heating or cooling unit coupled to client 702 to adjust the ID to a predetermined temperature.

Client 702 can then send the captured two images to server 704 (operation 716). Server 704 can optionally pre-process the received two images (operation 718). Pre-processing the images can involve rotating and/or cropping the captured images in such a way that a processed image can compose only the ID oriented in a predetermined direction. In some embodiments, a previously trained machine-learning module can be used to locate the ID in a captured image to facilitate the cropping and/or rotating operations.

The server can compare the two images captured under different environmental factors (operation 720). In some embodiments, the server may obtain a differential image by subtracting pixel values of one image from corresponding pixel values of the other image. This requires that the IDs in the two images are carefully aligned, and such an alignment can be achieved by using a previously trained machine-learning module to locate the ID in each image.

The server can then determine whether the ID displayed by the user is genuine based on the comparison result of the two images (operation 722). More specifically, the server can determine whether the ID displayed in front of the camera is a real, physical ID or a paper or electronic copy of a physical ID. In some embodiments, the server determines whether the ID is genuine based on the differential image. More specifically, server 704 can send the differential image to a previously trained machine-learning module (e.g., a deep neural network or an SVM classifier), which determines whether the ID is genuine based on the differential image. Alternatively, features can be extracted from the differential image, and the extracted features can be sent to the machine-learning module.

In response to the server determining that the ID is genuine, the server authenticates the user to allow the user to access the service (operation 724). More specifically, the server may perform conventional image recognition techniques to extract user-identity information from the ID (e.g., name or number displayed on the ID or facial features of the photo shown on the ID) and authenticate the user based on the extracted user-identity information. Because the ID has been identified genuine, user-identity information extracted from the ID can also be considered as genuine.

In the example shown in FIG. 7, the pre-processing and comparison of the images and the operation of determining the authenticity of the ID based on the processed and compared images are performed by server 704. However, in practice, it is also possible for client 702 to perform a portion or all of these operations. For example, client 702 may generate the object-identification result based on the captured images. In such a scenario, client 702 only needs to send the physical-object-identification result to server 704, which can in turn allow or deny the user's access to services on server 704 based on the physical-object-identification result.

Exemplary Computer System and Apparatus

Figure 8:
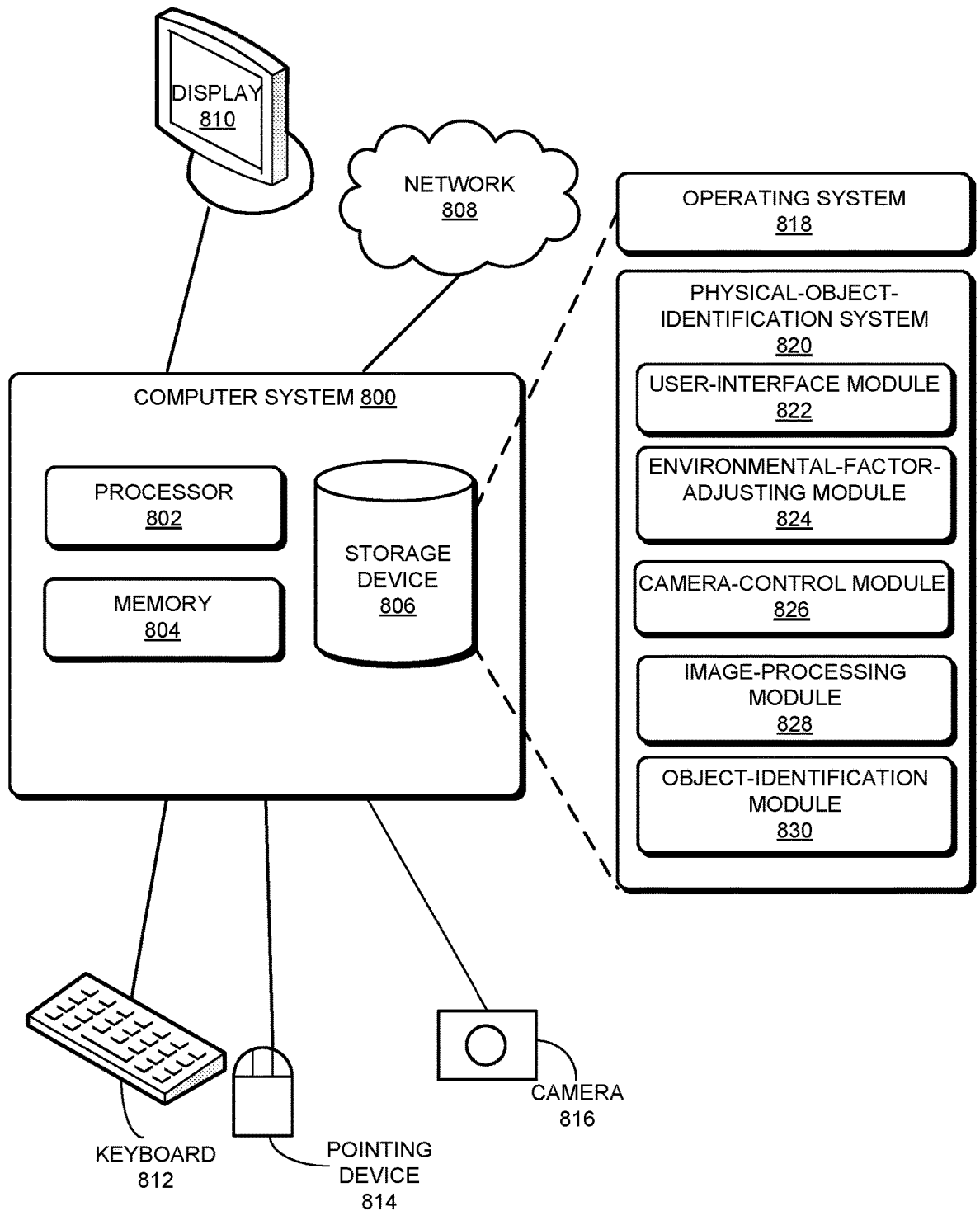
FIG. 8 illustrates an exemplary computer system that facilitates a physical-object-identification system, according to one embodiment.

FIG. 8 illustrates an exemplary computer system that facilitates a physical-object-identification system, according to one embodiment. Computer system 800 includes a processor 802, a memory 804, and a storage device 806. Computer system 800 can be coupled to a display device 810, a keyboard 812, a pointing device 814, and a camera 816, and can also be coupled via one or more network interfaces to network 808. Storage device 806 can store an operating system 818, and a physical-object-identification system 820.

Physical-object-identification system 820 can include instructions, which when executed by computer system 800, can cause computer system 800 to perform methods and/or processes described in this disclosure. Specifically, physical-object-identification system 820 can include instructions for displaying a user interface (user-interface module 822). Physical-object-identification system 820 can also include instructions for adjusting environmental factors to which a to-be-identified object is exposed (environmental-factor-adjusting module 824) and instructions for controlling the camera to capture images of the to-be-identified object (camera-control module 826). Furthermore, physical-object-identification system 820 can include instructions for pre-processing the captured images (image-processing module 828) and instructions for identifying the to-be-identified object (object-identification module 830). More specifically, image-processing module 828 and object-identification module 830 can also include one or more machine-learning modules.

Figure 9:
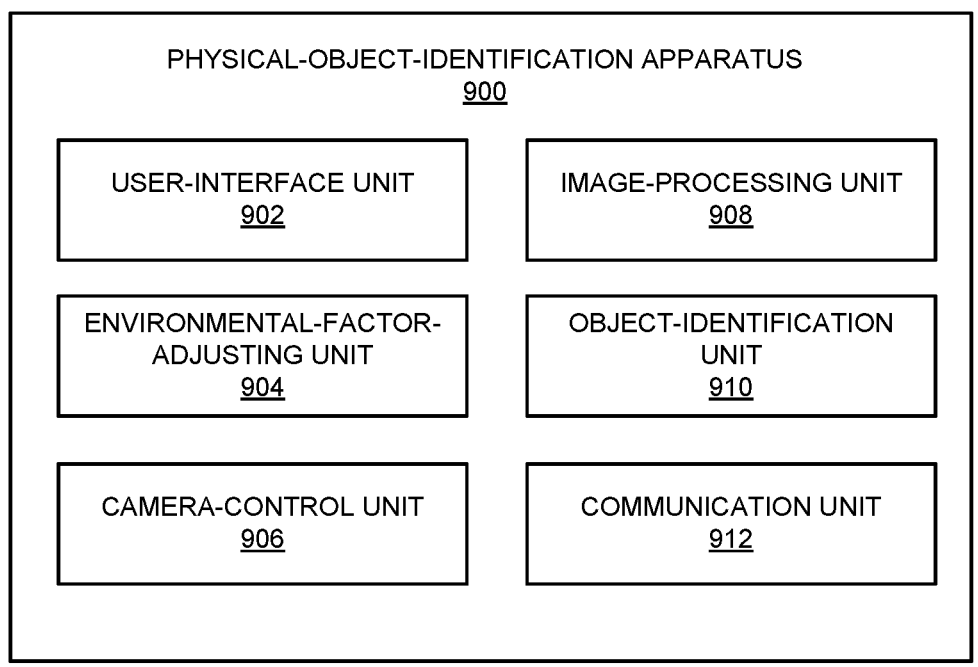
FIG. 9 illustrates an exemplary apparatus that facilitates a physical-object-identification system, according to one embodiment.

FIG. 9 illustrates an exemplary apparatus that facilitates a physical-object-identification system, according to one embodiment. Apparatus 900 can comprise a plurality of units or apparatuses that may communicate with one another via a wired, wireless, quantum light, or electrical communication channel. Apparatus 900 may be realized using one or more integrated circuits, and may include fewer or more units or apparatuses than those shown in FIG. 9. Further, apparatus 900 may be integrated in a computer system, or realized as a separate device that is capable of communicating with other computer systems and/or devices. Specifically, apparatus 900 can comprise units 902-910, which perform functions or operations similar to modules 822-830 of computer system 800 of FIG. 8, including: a user-interface unit 902, an environmental-factor-adjusting unit 904, a camera-control unit 906, an image-processing unit 908, and an object-identification unit 910. Apparatus 900 can further include a communication unit 912.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing embodiments described herein have been presented for purposes of illustration and description only. They are not intended to be exhaustive or to limit the embodiments described herein to the forms disclosed. Accordingly, many modifications and variations will be apparent to practitioners skilled in the art. Additionally, the above disclosure is not intended to limit the embodiments described herein. The scope of the embodiments described herein is defined by the appended claims.

What is claimed is:

1. A computer-implemented method for authenticating an object, the method comprising:
    capturing, by an image capturing device, a first image of the object while the object is placed in an environment having a first set of target environmental factors;
    capturing, by the image capturing device, a second image of the object while the object is placed in an environment having a second set of target environmental factors that are different from the first set of target environment factors;
    transmitting, by the image capturing device, the first image along with the second image to a computer to allow the computer to generate image-difference information by comparing the first image and the second image and input the generated image-difference information to a previously trained machine-learning model to determine an authenticity of the object, wherein the authenticity of the object is determined based on features extracted from the image-difference information.

2. The method of claim 1, wherein generating the image-difference information further comprises:
   extracting pre-determined features from the captured first or second image; and
   generating the image-difference information based on the extracted pre-determined features.

3. The method of claim 1, wherein generating the image-difference information further comprises comparing at least a portion of the first image with a corresponding portion of the second image.

4. The method of claim 1, further comprising one or more of:
   rotating the captured first or second image;
   cropping the captured first or second image; and
   pre-processing the captured first or second image to reduce blurriness.

5. The method of claim 1, wherein the image-difference information comprises one of:
   a differential image generated based on the captured first and second images; and
   features extracted from the differential image.

6. The method of claim 1, wherein the first or second set of target environmental factors comprise one or more of:
   a target illumination condition;
   a target temperature;
   a target humidity level;
   a target air pressure level;
   a target electrical field condition; and
   a target magnetic field condition.

7. A computer-implemented method for authenticating a user, the method comprising:
   receiving a service request from the user;
   prompting the user to display an identification card to a camera;
   configuring the camera to capture a first image of the identification card while the identification card is placed in an environment having a first set of target environmental factors;
   configuring the camera to capture a second image of the identification card while the identification card is placed in an environment having a second set of target environmental factors that are different from the first set of target environment factors;
   transmitting, by the camera, the first image along with the second image to a computer to allow the computer to determine image-difference information based on the first and second images and input the image-difference information to a previously trained machine-learning model to determine an authenticity of the identification card.

8. The method of claim 7, wherein the first or second set of target environmental factors comprise at least a target illumination condition, and wherein the camera is configured such that the first image is captured with a flash associated with the camera being turned on.

9. The method of claim 8, wherein configuring the camera to capture the second image comprises capturing the second image without turning on the flash.

10. A computer system, comprising:
    a processor; and
    a storage device coupled to the processor and storing instructions, which when executed by the processor cause the processor to perform a method for authenticating an object, the method comprising:
      capturing, by an image capturing device, a first image of the object while the object is placed in an environment having a first set of target environmental factors;
      capturing, by the image capturing device, a second image of the object while the object is placed in an environment having a second set of target environmental factors that are different from the first set of target environment factors;
      transmitting, by the image capturing device, the first image along with the second image to a computer to allow the computer to generate image-difference information by comparing the first image and the second image and input the generated image-difference information to a previously trained machine-learning model to determine an authenticity of the object, wherein the authenticity of the object is determined based on features extracted from the image-difference information.

11. The computer system of claim 10, wherein generating the image-difference information further comprises:
    extracting pre-determined features from the captured first or second image; and
    generating the image-difference information based on the extracted pre-determined feature.

12. The computer system of claim 10, wherein generating the image-difference information further comprises comparing at least a portion of the first image with a corresponding portion of the second image.

13. The computer system of claim 10, wherein the method further comprises one or more of:
    rotating the captured first or second image;
    cropping the captured first or second image; and
    pre-processing the captured first or second image to reduce blurriness.

14. The computer system of claim 10, wherein the image-difference information comprises one of:
    a differential image generated based on the captured first and second images; and
    features extracted from the differential image.

15. The computer system of claim 10, wherein the first or second set of target environmental factors comprise one or more of:
    a target illumination condition;
    a target temperature;
    a target humidity level;
    a target air pressure level;
    a target electrical field condition; and
    a target magnetic field condition.

* * * * *

UNITED STATES PATENT AND TRADEMARK OFFICE
CERTIFICATE OF CORRECTION

PATENT NO. : 11,182,889 B2
APPLICATION NO. : 16/126597
DATED : November 23, 2021
INVENTOR(S) : Yan Wang and Xuetao Feng It is certified that error appears in the above-identified patent and that said Letters Patent is hereby corrected as shown below:

In the Claims

Claim 11, Column 18, Line 35 "extracted pre-determined feature" should read "extracted pre-determined features"

Signed and Sealed this
Seventeenth Day of May, 2022

Katherine Kelly Vidal
*Director of the United States Patent and Trademark Office*